United States Patent [19]

Alafandi et al.

[11] 4,198,319

[45] Apr. 15, 1980

[54] METHOD OF PRODUCING ZEOLITIC CATALYSTS WITH SILICA ALUMINA MATRIX

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 874,755

[22] Filed: Feb. 3, 1978

Related U.S. Application Data

[63] Continuation-in-part of Ser. No. 769,118, Feb. 16, 1977, Pat. No. 4,142,995.

[51] Int. Cl.$^2$ .......................... B01J 29/04; B01J 29/08
[52] U.S. Cl. .................................................. 252/455 Z
[58] Field of Search ...................................... 252/455 Z

[56] References Cited

U.S. PATENT DOCUMENTS

| | | | |
|---|---|---|---|
| 3,449,265 | 6/1969 | Gladrow et al. | 252/455 Z |
| 3,542,670 | 11/1970 | Erickson et al. | 252/455 Z |
| 3,557,024 | 1/1971 | Young et al. | 252/455 Z |
| 3,558,476 | 1/1971 | Robbins, Jr. et al. | 252/455 Z |
| 3,609,103 | 9/1971 | Gladrow et al. | 252/455 Z |

*Primary Examiner*—Carl F. Dees
*Attorney, Agent, or Firm*—Philip Subkow; Bernard Kriegel

[57] ABSTRACT

This invention relates to zeolitic catalysts composed of an exchanged zeolite of the faujasite type and a matrix composed of clay and an alumina-silica component.

14 Claims, No Drawings

METHOD OF PRODUCING ZEOLITIC CATALYSTS WITH SILICA ALUMINA MATRIX

BACKGROUND OF THE INVENTION

The prior art has used alumina or silica alumina gels as matrix for exchanged zeolites of the faujasite type as, for an example, in U.S. Pat. Nos. 3,140,249, 3,449,265, 3,542,670, 3,557,024, 3,609,103, and 3,558,476. The Filtrol Corporation has for many years sold catalysts composed of rare earth exchange zeolites mixed with alumina and clay produced by spray drying a slurry of the zeolite, hydrated alumina and clay. The clay may be either acid treated halloysite or, ball clay, or other kaolins, or mixtures thereof.

The art of formulation of catalysts composed of zeolites, alumina and clay is well known to those skilled in the art.

Reference may be had to applications Ser. No. 696,889, filed June 17, 1976 now U.S. Pat. No. 4,086,187 and Ser. No. 514,567, filed Oct. 15, 1974 now U.S. Pat. No. 4,010,116 for further description of such catalysts and for improvements therein disclosed and claimed therein.

STATEMENT OF THE INVENTION

We have discovered that the addition of the silica-alumina gel having a relatively limited mole ratio of $SiO_2/Al_2O_3$ to mixtures composed of exchange zeolite of the faujasite type, hydrated alumina and clay results in improved catalytic properties, and in its resistance to abrasion.

The activity is determined as percent conversion by the improved micro-activity test as described in Oil and Gas Journal, see issues of 1966, Vol. 64, No. 39, pp. 7, 84 and 85, and November 22, 1971, pp. 60–80, when preceded by steam for two hours in each case at 1450° F., it is termed M activity, after steaming at 1500° F., it is termed S activity, after steaming at 1550° F., it is termed S+ activity.

One of the desirable characteristics of a cracking catalyst of the type employed in fluid catalytic properties is its resistance to attrition. The prior art catalysts produced by spray drying a slurry of zeolite for example of the Y type and the X type (see Milton U.S. Pat. No. 2,882,244 and Breck U.S. Pat. No. 3,130,007) and also see Secor U.S. Pat. No. 3,140,249 and hydrated alumina, for example, pseudoboehmite and clay have attrition resistances which the inventions of the aforesaid applications improve. The attrition index, determined as described by the method described in Secor, et al. U.S. Pat. No. 4,010,116, tests the % loss when the spray dried catalysts are subjected to abrasion when suspended in an air stream. The details of the test is described in the aforesaid patent to which reference is made. The lower the Abrasion Index, which gives the percent loss of the pellets of catalyst, the better.

We have found that in order to obtain both a high S+ activity and a desirable attrition resistance that it is desirable to adjust the composition of the silica-alumina hydrogel which is used in a clay matrix.

The conventional ratios of the zeolite, and clay containing matrix employed in the prior art zeolite catalysts may be employed in the catalysts in our invention, but a portion of the clay component substituted by the hydrated silica-alumina gel employed preferably as a dispersion with the zeolite component in the precursor slurry.

Hydrated alumina which when used as part of the matrix is preferred is in the form of pseudoboehmite. The compositions and properties of this hydrated alumina is discussed as described in the aforesaid patent to which reference is made. These applications are incorporated herein by this reference.

The catalyst of our invention is preferably in the form of microspheres comprising the following components in about the following ranges of weight ratios. The weight ratio of the zeolite which has been exchanged with a polyvalent cation to alumina and silica-alumina and clay is useful in ratios of weights of components in the range of about 10 to about 30 parts by weight of the exchanged zeolite; 10 to 25 parts by weight of the alumina, if alumina is used as a matrix component, and 60 to 10 parts by weight of silica-alumina gel and 70 to 10 parts by weight of kaolin clay all on a volatile free basis and the sum of all parts by weight adding to 100 parts by weight on a volatile free basis. If alumina is not used as a separate component of the matrix, it may be replaced by the silica-alumina gel.

We have found that the ratio of the $SiO_2$ to the $Al_2O_3$ in the silica-alumina gel has a strong influence on both the catalytic activity and the resistance to abrasion. The magnitude of this effect depends both on the composition of the zeolite and on the nature of the clay employed. As will be shown below, the catalyst shows both a relatively low value of the attrition index and a relatively high value of the catalytic activity in a relatively narrow range of the mole percent of $SiO_2$ in the silica-alumina gel. We prefer to employ a silica-alumina having an $SiO_2$ mole % in the gel in the range of about 40% to about 95% to obtain S+ activity in excess of about 25%. In order to obtain desirable attrition index we prefer to restrict the mole % of $SiO_2$ in the gel to about 70% or less. The magnitude of the attrition index depends not only on the composition of the matrix but also on the composition of the zeolite.

The zeolite catalyst for example is formulated as in the well known prior art methods of spray drying a slurry of hydrated alumina and clay. The preferred zeolite is a Y type which has been exchanged with a monovalent cation i.e., H or $NH_4$ or a polyvalent cation such as a divalent cation for example Ca, Mg, or a trivalent cation such as a rare earth cation or mixtures or by two or more different cations in sequence. The procedures are well known in the prior art. It is desirable to employ zeolites of the Y type which have been exchanged so as to reduce the Na content of the exchanged zeolite to less than 1%, and preferably less than 0.5%. Such methods are described in the applications referred to above and other procedures are described in the prior art referred to therein.

EXAMPLE 1

A slurry of a sodium Y type zeolite (see our above copending applications) at a pH of 12.5 and containing about 25% solids is acidified with sulfuric acid to a pH of 3.5. The slurry is filtered, and the filter cake is slurried to a solid content of about 25%. The resultant slurry is reacted with rare earth sulfate solution as described in U.S. Pat. No. 3,446,727, without introducing other metallic cations, to form an exchanged zeolite of about 10–15% by weight of rare earth ions expressed as rare earth oxides based upon the zeolite content on a volatile-free basis. The slurry is filtered and washed substantially sulfate free and is reslurried to about 25% to 30% solids content. This slurry of exchanged zeolites is used in the following examples:

$Na_2O$ 4.5 by weight
ReO 12.0% by weight
$Al_2O_3$ 26.0% by weight
Remainder silica ($SiO_2$)

ReO comprises about 60% $La_2O_3$ and about 40% $CeO_2$ by weight with a minor amount of other rare earth oxides.

EXAMPLE 2

Four hundred grams, on a volatile-free basis of a pseudoboehmite was peptized with 4.227 liters of water to which had been added 38 ml of 100% formic acid with moderate stirring for about 30 minutes. To this mixture was added 1,238 grams, on a volatile-free basis of ball clay and 400 grams of acid-treated halloysite referred to above, and the mixture was vigorously stirred for about 15 minutes. To the resultant mixture was added 463 grams, on a volatile-free basis, of the exchanged zeolite produced as in Example 1, with vigorous agitation. The ratio by weight of the components was 19% zeolite, 16% pseudoboehmite and 65% clay on a volatile-free basis. The mixture was spray dried at an inlet temperature of the flame of about 870° F. The outlet temperature of the combustion gases from the spray drier was 330° F. The air nozzle of the spray drier was at 25 psig pressure. The spray-drier feed was introduced at 21 psig pressure. Approximately 55% by weight of the finished spray-dried catalyst, collected as particles of 70 micron average diameter, determined by the above attrition index procedure on about 10 samples, showed a mean attrition index of about 45 with a 1 sigma of 14. The catalyst had a conversion by the above procedure as follows:

| °F. | % Conversion |
|---|---|
| 1450 (M) | 70 |
| 1500 (S) | 60 |
| 1550 (S+) | 20 |

The analysis of that product normalized on a volatile-free basis was as follows:

| | |
|---|---|
| $SiO_2$ | 51 Weight % |
| $Al_2O_3$ | 41 Weight % |
| ReO | 2.33 Weight % |
| $Fe_2O_3$ | 0.71 Weight % |
| $TiO_2$ | 1.29 Weight % |
| $Na_2O$ | 0.80 Weight % |
| $SO_3$ | 1.13 Weight % |
| V.M. | 15.4% |

EXAMPLE 3

Example 3 illustrates the advantage obtained from a catalyst by addition of a properly prepared silica alumina gel to the slurry of the matrix in place of some or all of the pseudoboehmite, prior to spray drying.

The silica alumina gel is prepared as follows: 5017 grams of sodium silicate (28.7% $SiO_2$-8.9% $Na_2O$ by weight) equivalent to 1440 grams of $SiO_2$ was dissolved in water to a concentration of 5–10% $SiO_2$. The slurry solution was acidified to a pH of 1.1 with sulfuric acid. 26.896 kilograms of an aluminum sulfate solution (equivalent to 1560 grams and $Al_2O_3$) was gradually added to the acidified solution with constant agitation. The weight ratio of the $SiO_2$ to the $Al_2O_3$ in the mixture should be from about 45% to 52% of $Al_2O_3$. The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 9.5 to about 9.8.

The mixture is vigorously stirred and the pH is maintained by a suitable adjustment for about two (2) hours to insure uniformity of the mixture. It is then heated to a temperature of about 75° to 80° C. for about 30 minutes and then immediately filtered and the filter cake washed with hot distilled water of about 80° C. The wash slurry is then slurried to a solid content of about 5% in distilled water which contained about 2 of ammonium nitrate and then filtered. The filter cake was then again slurried with ammonium nitrate solution as in the last previous step. The filter cake from the last step was again reslurried to an ammonium nitrate solution as above and filtered. The filter cake from the last filtration above was washed with distilled water to a sodium content of about 0.1 to about 0.2% $Na_2O$ and sulfate content of about 0.2 to about 0.3% $SO_3$. It is desired that the $Na_2O$ content and the $SO_3$ content shall be as low as possible.

The silica and alumina gel thus produced is preferably maintained in a sealed container prior to use in the catalyst of our invention. It should be used as promptly as possible since aging of the gel will impair its properties in producing a good attrition resistant catalyst.

EXAMPLE 4

The zeolite produced as in Example 1 was formulated with a matrix as in Example 2, but the matrix was modified by incorporating a silica-alumina gel formed as in Example 3 and omitting the pseudoboehmite. The mole % of the silica in the silica-alumina gel was 61%. The clay was ball clay.

The several samples had the following composition and had the following M and S+ activities and attrition indexes.

TABLE 1

| Sample | % Zeolite | % Gel | % Clay | Activity M | S+ | Attrition Index |
|---|---|---|---|---|---|---|
| 1 | 19 | 30 | 51 | 78 | 32 | 13.2 |
| 2 | 19 | 40 | 41 | 78 | 33 | 17 |
| 3 | 19 | 48 | 33 | 73 | 30 | 11 |
| 4 | 19 | 80 | — | 74 | 38 | 36 |

Another sample was formulated as in Sample 1 but substituting some of the gel with pseudoboehmite. The clay was all ball clay. The composition and properties of the catalyst was as follows on a volatile-free basis:

| Sample 5: | 19% zeolite, 18% $Al_2O_3$, 30% gel and 33% clay. | |
|---|---|---|
| M | S+ | |
| 76 | 36 | 16 |

The silica-alumina gel may be used in place of alumina in a clay matrix employed with an exchanged faujasite zeolite.

While silica-alumina gel in a clay matrix improves both the catalytic activity and the Attrition Index as compared with the catalyst of Examples 1 and 2, the difficulties of first preparing a silica-alumina gel of sufficiently low Na content, we have found may be avoided by dispersion with the zeolite either before or after exchange. The encapsulated zeolite is thus readily washed with much less difficulty than when the silica-alumina gel is prepared separately and mixed with the zeolite, clay and alumina. The resultant catalyst is not only improved in catalytic activity but also in attrition resistance.

EXAMPLE 5

To encapsulate the zeolite in the silica-alumina gel prior to exchanging of the faujasite zeolite and incorporation into the matrix, the following procedure may be followed:

N brand sodium silicate (28.7% $SiO_2$:7.8% $Na_2O$:) containing 7% by weight of silica at a pH of 12.5 to 13 is acidified to a pH of 11 with dilute sulfuric acid of 1 to 1 concentration under constant agitation. The exchanged faujasite zeolite produced as in Example 1, is stirred into this solution for 30 minutes to assure good dispersion. An aluminum sulfate solution at a concentration of about 4 to 5 weight percent $Al_2O_3$ is introduced with vigorous agitation for an hour to lower the pH to about 3 to 3.5. The pH of the slurry is adjusted to about 9 to 9.5 using ammonium hydroxide solution. The mixture is homogenized by passage through a colloid mill. The attrition index of the catalyst has been found to depend on the degree of homogenization, all other things being equal. The slurry is heated to about 50° to 80° C. for an hour.

The slurry is filtered and washed and reslurried and washed with 2% of ammonium nitrate and finally with distilled wash water in accordance with the procedures set forth in Example 1 and spray dried. The properties of the catalyst produced by encapsulating the exchanged zeolite is above, is typically as set forth hereinbelow.

Microactivity M activity 76%, S activity 63%, S+ activity 36%, and Attrition Index 8.

For purposes of comparison, the results of the various procedures may be tabulated as follows:

TABLE 2

| Catalyst Examples | Activity | | | Attrition Index |
|---|---|---|---|---|
| | M | S | S+ | |
| 1 & 2 | 70 | 60 | 20 | 40 |
| Example 4 | | | | |
| Sample 1 | 78 | | 32 | 13.2 |
| Sample 2 | 75 | | 33 | 17 |
| Sample 3 | 73 | | 30 | 11 |
| Sample 5 | 76 | | 36 | 16 |
| Example 5 | 76 | 63 | 36 | 8 |

The improvement in the S+ activity and attrition resistance by the silica-alumina gel of Examples 4 and 5, as compared with Example 2, and the improvement in S+ activity in Examples 4 and 5, illustrates the unexpected nature of the invention occasioned by substituting a portion of the clay in the clay matrix by the silica-alumina gel of our invention.

We have found that the composition of the silica to alumina gel has a substantial influence on the activity characteristics and the resistance to abrasion of the catalyst which employs silica alumina gel in its matrix.

The following example illustrates the improvement obtained by employing silica alumina gel in a catalyst when the ratio of the percent silica in the gel is adjusted so as to obtain a catalyst with a desirable high activity or a desirable low attrition index as both a high activity and a low attrition index.

EXAMPLE 6

Several silica-alumina gels were made according to the procedure described in Example 3, by varying the raction mixtures to give hydrogels having different $SiO_2$ to $Al_2O_3$ mole ratios as described below:

| Sample 1 | $SiO_2/Al_2O_3$* | Mole % $SiO_2$ |
|---|---|---|
| | .62 | .38 |
| | 1.02 | 50 |
| | 2.05 | 67 |
| | 5.55 | 85 |
| | 13.9 | 93 |
| | 30.3 | 97 |

*Mole ratios

Each of these hydrogels were separately combined with a zeolite exchanged as described below in the following proportions on a volatile-free basis, 19% zeolite, 30% of the $SiO_2$-$Al_2O_3$ gel, 33% acid heated halloysite and pseudoboehmite equal to 18% $Al_2O_3$, all on a volatile-free basis. The mixture was spray dried as in Example 5.

The sodium Y zeolite was exchanged first with $MgCl_2$ and then with rare earth sulfate. It is subsequently calcined and reexchanged with rare earth sulfate to reduce the Na, expressed as $Na_2O$ on a volatile-free basis to about 0.4 to about 0.6%.

The activity rises sharply as the silica content in the gel is in the region of more than 38% and less than 97% mole percent, but the attrition index for these series of catalysts becomes excessively large if the silica content of the gel exceeds about 50 moles percent.

The optimum values of the composition of the silica-alumina gel and the ratio of the clay to the silica-alumina gel may be determined by those skilled in the art employing the information given in this specification. The resultant determative parameter to obtain an optimum result both for S+ activity and for attrition index, other factors being substantially the same is the mole percent of $SiO_2$ in the silica-alumina hydrosol and the resulatant gel.

We prefer to employ a gel containing from about 50 to about 70 for example, about 60 mole percent of silica in the gel.

If at the stage of the operation, after the slurry is heated to 70° to 80° C. as in Example 5, the zeolite has not been previously exchanged with polyvalent cations, it may be exchanged at this point in the treatment. Thus, the slurry encapsulated unexchanged zeolite iether of the X type or the Y type has its pH adjusted to a pH of 3.5-7 with sulfuric acid and is exchanged with rare earth using the procedures as in Example 1 but preferably at a constant pH of about 6 or less employing the procedures previously described in connection with Example 1.

While we have described our invention employing a previously exchanged zeolite as the zeolite to be mixed with the gel and clay, we may instead employ other sequences of operation.

Instead of employing a previously exchanged zeolite to be mixed with the gel or the gel and clay as described above, or carrying out the exchange after it is mixed with the gel, the unexchanged sodium zeolite may be combined with the gel by any of the procedures described above. The slurry is spray dried to produce microspheres. The microspheres may then be exchanged to volatile-free basis to less than 1%, preferably to less than 0.5% by exchange with monovalent cations such as H or $NH_4$, or with polyvalent cations such as Ca or Mg, such as rare earth, as for example described in Examples 1 and 5.

We claim:

1. In a process for forming a catalyst comprising mixing in a slurry a zeolite of the faujasite type, a silica-alumina gel containing silica in the range of about 50 to about 70 mole percent, and clay and spray drying said slurry.

2. The process of claim 1, in which the ratio of the zeolite, silica-alumina gel and clay are in the ratios of from about 10 to about 30 parts by weight of zeolite, and about 60 to 10 parts by weight of silica-alumina and about 70 to about 10 parts by weight of clay, the parts all components adding to a 100 parts by weight all on a volatile-free basis.

3. In the process of claim 2 in which said slurry contains about 10 to about 25% of pseudoboehmite.

4. In the process of claim 1, preparing said silica-alumina gel and adding said silica-alumina gel to said slurry separately from the addition of the other components.

5. In the process of claim 2, preparing said silica-alumina gel and separately mixing the zeolite with silica-alumina gel and then mixing the same with hydrated alumina and clay in said slurry.

6. The process of claim 1 exchanging said zeolite with a cation or cations chosen from the group consisting of H and $NH_4$ and polyvalent cations prior to mixing with said silica-alumina gel and claim.

7. The process of claim 2, exchanging said zeolite with a polyvalent cation prior to mixing with the silica-alumina gel and clay.

8. The process which comprises forming a mixture of a silica-alumina gel, said silica-alumina gel containing from about 50 to about 70 mole percent of $SiO_2$, in a slurry containing a zeolite of the faujasite type and spray drying the mixture exchanging the spray dried mixture of the zeolite and silica-alumina with a cation or cations chosen from the group consisting of H and $NH_4$ and polyvalent cations.

9. The process of claim 8 in which pseudoboehmite is added to the slurry before spray drying.

10. The process of claim 8 in which the ratio of the zeolite, hydrated alumina, silica-alumina gel and clay are in the ratios of from about 10 to about 30 parts by weight of zeolite, and about 60 to about 10 parts by weight of silica-alumina and about 70 to about 10 parts by weight of clay, the parts all four components adding to 100 parts by weight all on a volatile-free basis.

11. The process of claim 10 in which said slurry contains about 10 to about 25% of pseudoboehmite.

12. The process of forming a catalyst which comprises mixing a zeolite of the faujasite type with silica-alumina gel and clay in a water slurry, said silica-alumina gel containing from about 50 to about 70 mole percent of $SiO_2$, and spray drying said slurry to form microspheres and exchanging said microspheres with a cation or cations chosen from the group of H, $NH_4$ and polyvalent cations.

13. The process of claim 7 in which the ratio of the zeolite, silica-alumina gel and clay in the slurry are in the ratios of from about 10 to about 30 parts by weight of zeolite, and about 60 to about 10 parts by weight of silica-alumina and about 70 to about 10 parts by weight of clay, the parts all four components adding to 100 parts by weight all on a volatile-free basis.

14. The process of claim 13 in which the slurry contains about 10 to about 25% of pseudoboehmite.

* * * * *